Patented June 28, 1949

2,474,671

UNITED STATES PATENT OFFICE 2,474,671

POLYMERIZATION OF OLEFINIC HYDROCARBONS WITH FRIEDEL-CRAFTS CATALYSTS

Arthur B. Hersberger, Drexel Hill, Pa., assignor to The Atlantic Refining Company, Philadelphia, Pa., a corporation of Pennsylvania No Drawing. Application April 29, 1947, Serial No. 744,798

8 Claims. (Cl. 260—85.3)

The present invention relates to improvements in the Friedel-Crafts polymerization of unsaturated hydrocarbons to produce polymer products of uniform composition and physical properties regardless of the degree of polymerization.

This application is a continuation-in-part of my copending application Serial No. 524,841, filed March 1, 1944, now abandoned, and entitled "Polymerization process."

An object of this invention is the Friedel-Crafts polymerization of an olefinic hydrocarbon or hydrocarbon mixture under conditions such that the exothermic heat of reaction is substantially counterbalanced by the heat of fusion of the reaction mixture, thus maintaining the reaction mixture at the desired reaction temperature and avoiding local overheating with consequent lack of uniformity of product. The technique of the present invention is applicable in the conversion of olefinic hydrocarbons into plastic polymers, resins, and rubber-like products.

A further object of this invention resides in a method for carrying out exothermic reactions at low temperature in order to produce polymers of substantial molecular weight, i. e., greater than 1500. The method is particulary valuable as applied in the polymerizable of iso-olefins or iso-olefin diolefin mixtures to rubber-like polymers having molecular weights of from 10,000 to 200,000.

It is known that olefinic hydrocarbons, including iso-olefins such as isobutylene, can be readily polymerized by contacting them with a solution of an active Friedel-Crafts type catalyst in a suitable solvent. It is also known that if high molecular weight polymers are to be produced, the reaction must be carried out at low temperature, temperatures of the order of $-100°$ C. being necessary, for example, to produce satisfactory rubber-like polymers from isobutylene.

Large amounts of heat are liberated in a very short period of time during the polymerization leading to the production of high molecular weight polymers, and as a consequence, control of the reaction temperature presents a difficult problem. The usual expedients, such as internal and external cooling by the evaporation of liquefied normally gaseous hydrocarbons, while admittedly beneficial particularly if accompanied by vigorous agitation of the liquid reaction mixture during addition of the catalyst or catalyst solution, do not prevent local overheating in the reaction area. Such local overheating is highly undesirable because it results in contamination of the polymer product with low molecular weight polymers.

The method of the present invention, whereby the foregoing and other objects are achieved, distinguishes from prior practice in that the reaction materials are brought together in the form of finely divided solid particles. Although particularly adapted to the production of rubber-like polymers from isobutylene or from isobutylene-isoprene mixtures, it may also be advantageously applied in the polymerization of other olefinic hydrocarbons polymerizable with Friedel-Crafts catalysts, for example, the amylenes, hexylenes, heptylenes, octeylenes, nonylenes, and decylenes, and particularly the iso- or other branched-chain isomers thereof. Cyclic olefinic hydrocarbons which may be polymerized include the alpha alkyl styrenes such as alpha methyl styrene, alpha ethyl styrene, alpha propyl styrene, alpha methyl para methyl styrene, alpha methyl para ethyl styrene, alpha methyl para propyl styrene, alpha methyl meta methyl styrene, alpha ethyl styrene, alpha ethyl para ethyl styrene, and the like. Copolymers or interpolymers may also be produced by reacting mixtures of the aliphatic mono-olefins, or mixtures of aliphatic mono-olefin with the cyclic olefinic hydrocarbons, or mixtures of aliphatic mono-olefins and diolefins, or diolefins with cyclic olefinic hydrocarbons, or mixture of aliphatic mono-olefins, diolefins, and cyclic olefinic hydrocarbons. Diolefins which may be employed are exemplified by butadiene, isoprene, dimethyl butadiene, cyclopentadiene, pentadiene, hexadiene, and similar conjugated diolefins. Acetylenic hydrocarbons may be used in lieu of or in addition to the diolefins, and include compounds such as the methyl acetylenes, ethyl aceylenes, propyl acetylenes, phenyl acetylenes, etc.

The nature of the polymer products, i. e., plastics, resins, and rubber-like compounds depends upon the type and quantity of olefinic hydrocarbon or hydrocarbons used, as well as the polymerization conditions, particularly temperature. Iso-olefins such as isobutylene may be converted into high molecular weight linear polymers which are plastic or rubber-like. Mixtures of iso-olefins and diolefins such as isobutylene and butadiene, or isobutylene and isoprene will produce rubber-like products, particularly when the diolefin comprises not more than about 30% to 40% of the mixture. To obtain products which will vulcanize satisfactorily and retain high tensile strength and elasticity, the proportion of diolefin is preferably maintained below about 5%, for example, 0.5% to 3% in the case of isoprene, and 2% to 20% in the case of butdiene. In the copolymerization of an alpha alkyl styrene with a diolefin, the product is usually resinous in character, while in the copolymerization of an alpha alkyl styrene with an iso-olefin, the product may range from a resinous to rubber-like material, depending upon the amount of iso-olefin used. Tacky or adhesive products may be obtained by the interpolymerization of mixtures of an alpha alkyl styrene, a diolefin, and an iso-olefin. In general, the ratio of conjugated diolefin to the other components should not be greater than about 1 to 1, for example, in an alpha methyl styrene, isobutylene, butadiene mixture, the amount of butadiene should not exceed that of the two remaining components, and in an alpha methyl styrene, isobutylene, isoprene mixture, the isoprene should not exceed 20% of the entire mixture. The ratio of alpha alkyl styrene to iso-olefin may be varied as desired. In the production of interpolymers of alpha methyl styrene, isobutylene, and isoprene, good results are obtained with mixtures comprising 10% to 30% alpha methyl styrene, 1% to 20% isoprene, and the balance isobutylene. Resin products may be obtained by polymerizing alpha alkyl styrenes, per se, or in admixture with small amounts of iso-olefins such as isobutylene, or with diallyl or divinyl benzene, the percentage of the aliphatic olefins being of the order of 0.1% to 1% of the mixture. With large amounts of iso-olefin, for example, 50% to 90%, rubber-like products are obtained. Resins may also be obtained by polymerizing iso-olefins such as isobutylene, isoamylene, or iso-hexylene with di-isobutenyl benzene, or di-isobutenyl toluene, or di-isobutenyl xylene, or di-isobutenyl styrene, the proportions of the reactants varying over a wide range, e. g., from 5% to 95% of iso-olefin and 95% of 5% of the di-isobutenyl aryl compound.

The present invention may be further understood from the following description, which, however, is not to be construed as limiting the scope thereof.

The olefinic hydrocarbon to be polymerized is first liquefied, if it is not normally liquid, and is then diluted with a suitable inert diluent, preferably methyl or ethyl chloride, the diluent being added in an amount to be hereinafter made clear. Following the dilution, the hydrocarbon-diluent mixture is frozen by suitable means, for example, as with liquid nitrogen and the resulting solid crushed to a fine powder. A catalyst solution consisting, preferably, of anhydrous aluminum chloride in methyl or ethyl chloride and containing from 0.1 to 4.0 percent aluminum chloride, most suitably from 0.4 to 0.5 percent is next prepared. This solution, like the hydrocarbon-diluent mixture, is converted to finely divided solid particles by first freezing it and then pulverizing the solidified product. The pulverizing or crushing of the frozen mass in the case of both the hydrocarbon-diluent mixture and the catalyst solution must, of course, be carried out under conditions avoiding melting of the material. In a procedure for producing the finely divided solid particles without the necessity of grinding or pulverizing, the liquid material may be injected through a suitable atomizing device into a chamber cooled to a temperature sufficiently low to cause solidification of the liquid droplets produced by the atomizing device or, alternatively, the particles may be produced through the use of a refrigerated flaking drum into which the liquid material is introduced.

The ratio of catalyst to hydrocarbon used in the execution of the invention may be varied within wide limits. In using a solution of aluminum chloride in ethyl chloride to effect the polymerization of iso-olefin or iso-olefin diolefin mixtures, sufficient diolefin being used to give a vulcanizable polymer, it has been found that a weight ratio of catalyst to olefinic hydrocarbon (ethyl chloride-free basis) of from .001 to .01:1, preferably from .004 to .005:1, gives very satisfactory results. However, with other olefins or olefinic mixtures, the amount of catalyst used may or may not fall within this specific range.

After the production of the finely divided solid particles, the same are intimately mixed in a vessel or chamber maintained at a temperature below the fusion temperature of the particles, following which the reaction is initiated by causing melting of a limited area of the composite mass as by the insertion, for example, of an object such as a piece of wire or an ordinary glass stirring rod thereinto, the temperature of the wire or rod being above the fusion temperature of the mass. Prior to such step, no reaction will occur so long as the mass is maintained below its fusion temperature. Reaction, following localized melting of the mass, is indicated by yellowing in the area affected and no further heating is necessary since the reaction from this point forward is self-perpetuating. Rise of temperature during the course of the reaction to a point at which undesirable polymers are formed does not occur as in prior methods, since the heat of reaction is counterbalanced by the heat of fusion of the solidified reaction materials, i. e., the heat of reaction and heat of fusion are substantially equivalent, the desired balance being obtained by adjustment of the quantity of diluent employed in the dilution of the hydrocarbon.

In determining the amount of diluent which should be employed in the dilution of the olefinic hydrocarbon 100 percent yield in the polymerization is assumed, although actually such yield will not, of course, be realized. Theoretically, the temperature of the mass upon completion of the reaction will be the same as the temperature at the start of the reaction.

If desired, the entire quantity of diluent required may be introduced through the medium of the catalyst solution, the olefinic hydrocarbon being frozen without first diluting it.

When the reaction has stopped, recovery of the polymer product may be effected by any suitable means, for example, by passing the reacted mass at a relatively elevated temperature through a vacuum zone to strip out diluent and unreacted hydrocarbon. A preliminary treatment with ammonia gas, or with a lower aliphatic alcohol such as methyl, ethyl or propyl alcohol, to destroy the activity of the catalyst may be necessary or advisable. Such treatment should be carried out before the temperature of the mass has risen appreciably.

The invention is further illustrated by the following example:

*Example I*

Liquid isobutylene and isoprene were mixed in a weight ratio of 97 to 3 and the resultant mixture diluted with ethyl chloride, following which the hydrocarbon-diluent mixture was stirred in a vessel immersed in a bath of liquid nitrogen until completely solidified. The frozen mass was then covered with liquid nitrogen and pulverized by grinding with a pestle fashioned of an essentially non heat-conducting material. A catalyst solution consisting of aluminum chloride in ethyl chloride (0.44 percent) was frozen and ground in the same manner. The two pulverized materials were thoroughly mixed under liquid nitrogen and the mixture transferred to a precooled reaction vessel surrounded by a bath maintained throughout the reaction at a temperature between −85° C. and −100° C. The reaction was started by dipping a piece of wire, which had been at room temperature, into the mixture. The reaction, once initiated, was complete in a very short time. The rubber-like polymer product, upon being removed from the reactor, was kneaded in hot water. Upon inspection, it was found to be of uniform quality throughout.

The actual ratio of reactants in the foregoing run was as follows, parts given being by weight:

| | Parts |
|---|---|
| Isobutylene-isoprene 97/3 | 5.0 |
| Catalyst solution (0.44% AlCl₃ in ethyl chloride) | 5.0 |
| Ethyl chloride | 13.8 |

The stated amount of ethyl chloride operated to throw the heat of reaction and the heat of fusion of the system into substantial balance.

The method of the invention is not limited to the use of aluminum chloride as the catalyst nor to the use of ethyl chloride as the solvent for the catalyst and as the diluent for the hydrocarbon. Aluminum bromide, titanium tetrachloride, tin tetrachloride, zinc chloride, and the like are exemplary of other metal halide catalysts of the Friedel-Crafts type which may be used. The use of boron fluoride is not excepted, solutions or dispersions thereof in ethyl chloride, for example, being readily solidifiable.

Other alkyl halides which may be employed in lieu of ethyl chloride in the execution of the invention include methyl chloride, methyl bromide and iodide, ethyl bromide and iodide, propyl and isopropyl chloride, bromide, and iodide, butyl chloride, bromide, and iodide, isobutyl chloride and iodide, etc. The corresponding fluorides, although applicable, are generally less satisfactory. Other inert solvents are exemplified by carbon disulfide, chloroform, liquefied normally gaseous paraffin hydrocarbons such as methane, ethane, propane, and n-butane.

Depending upon the nature of the polymer desired, the polymerization temperature may range as low as −100° C. to −120° C., temperatures between −50° C. and −100° C. generally producing relatively high molecular weight polymers. The technique of the present invention is applicable, however, in the Friedel-Crafts polymerization of olefinic materials in all cases where the reactant mixture, including catalyst and solvent or diluent, is capable of existing as a solid mixture and is non-reacting in such state but is capable of reaction upon melting of a small portion of the reactant mass. In general the technique is most advantageously employed where the polymerization reaction is rapid and the exothermic heat of reaction must be quickly removed to avoid substantial rise in temperature of the reactants. By adjusting the quantity of inert solvent or diluent with respect to the other components, the heat of reaction may be substantially counterbalanced by the heat of fusion of the reactant mixture.

I claim:

1. In a process for producing polymers from olefinic hydrocarbons containing at least 4 carbon atoms polymerizable by a Friedel-Crafts catalyst, the improvement which comprises providing an intimate mixture of finely divided solid particles of said olefinic hydrocarbon, Friedel-Crafts catalyst, and an inert solvent, and thereafter causing melting of a small portion of said mixture, the ensuing reaction being characterized in that the heat of reaction is substantially counterbalanced by the heat of fusion of the reaction mixture, such counterbalance being achieved by regulating the amount of inert solvent employed in the initial reaction mixture.

2. In a process for producing polymers from olefinic hydrocarbons containing at least 4 carbon atoms polymerizable by a Friedel-Crafts catalyst, the improvement which comprises providing an intimate mixture of finely divided solid particles of said olefinic hydrocarbon, Friedel-Crafts catalyst, and an alkyl halide containing not more than 3 carbon atoms, and thereafter causing melting of a small portion of said mixture to initiate the polymerization reaction, the ensuing reaction being characterized in that the heat of reaction is substantially counterbalanced by the heat of fusion of the reaction mixture, such counterbalance being achieved by regulating the amount of alkyl halide employed in the initial reaction mixture.

3. In a process for producing polymers from olefinic hydrocarbons containing at least 4 carbon atoms polymerizable by a Friedel-Crafts catalyst, the improvement which comprises diluting said olefinic hydrocarbon with an alkyl halide containing not more than 3 carbon atoms, forming a solution of a Friedel-Crafts catalyst is an additional quantity of said alkyl halide, separately converting the diluted olefin and the catalyst solution into finely divided solid particles, intimately mixing said particles, and thereafter causing melting of a small portion of the resulting mixture, the ensuing reaction being characterized in that the heat of reaction is substantially counterbalanced by the heat of fusion of the reaction mixture, such counterbalance being achieved by regulating the amount of the alkyl halide employed in the initial reaction mixture.

4. In a process for producing polymers from olefinic hydrocarbons containing at least 4 carbon atoms polymerizable by a Friedel-Crafts catalyst, the improvement which comprises diluting said olefin hydrocarbon with an alkyl halide containing not more than 3 carbon atoms, forming a solution of a Friedel-Crafts catalyst in an additional quantity of said alkyl halide, separately solidifying the diluted olefin and the catalyst solution, comminuting and commingling the solidified materials, and thereafter causing melting of a small portion of the resulting mixture, the ensuing reaction being characterized in that the heat of reaction is substantially counterbalanced by the heat of fusion of the reaction mixture, such counterbalance being achieved by regulating the amount of alkyl halide employed in the initial reaction mixture.

5. In a process for producing polymers from iso-olefinic hydrocarbons polymerizable by a Friedel-Crafts catalyst, the improvement which comprises diluting said iso-olefin hydrocarbon with an alkyl halide containing not more than 3 carbon atoms, forming a solution of a Friedel-Crafts catalyst in an additional quantity of said alkyl halide, separately solidifying the diluted iso-olefin and the catalyst solution, comminuting and commingling the solidified materials, and thereafter causing melting of a small portion of the resulting mixture, the ensuing reaction being characterized in that the heat of reaction is substantially counterbalanced by the heat of fusion of the reaction mixture, such counterbalance being achieved by regulating the amount of alkyl halide employed in the initial reaction mixture.

6. In a process for producing polymers from a mixture of iso-olefin and diolefin hydrocarbons polymerizable by a Friedel-Crafts catalyst, the improvement which comprises diluting said iso-olefin diolefin hydrocarbon mixture with an alkyl halide containing not more than 3 carbon atoms, forming a solution of a Friedel-Crafts catalyst in an additional quantity of said alkyl halide, separately solidifying the diluted iso-olefin diolefin mixture and the catalyst solution, comminuting and commingling the solidified materials, and thereafter causing melting of a small portion of the resulting mixture, the ensuing reaction being characterized in that the heat of reaction is substantially counterbalanced by the heat of fusion of the reaction mixture, such counterbalance being achieved by regulating the amount of alkyl halide employed in the initial reaction mixture.

7. The method of producing rubber-like polymers, which comprises diluting a mixture of isobutylene containing 0.5% to 5% of isoprene with an alkyl halide containing not more than 3 carbon atoms, forming a solution of a Friedel-Crafts catalyst in an additional quantity of said alkyl halide, separately converting the diluted isobutylene isoprene mixture and the catalyst solution into finely divided solid particles, intimately mixing said particles, and thereafter causing melting of a small portion of the resulting mixture, the ensuing reaction being characterized in that the heat of reaction is substantially counterbalanced by the heat of fusion of the reaction mixture, such counterbalance being achieved by regulating the amount of the alkyl halide employed in the initial reaction mixture.

8. The method of producing rubber-like polymers, which comprises diluting a mixture of isobutylene containing 0.5% to 5% of isoprene with ethyl chloride, forming a solution of aluminum chloride in an additional quantity of ethyl chloride, separately solidifying the diluted isobutylene isoprene mixture and the aluminum chloride solution, comminuting and commingling the solidified materials, and thereafter causing melting of a small portion of the resulting mixture, the ensuing reaction being characterized in that the heat of reaction is substantially counterbalanced by the heat of fusion of the reaction mixture, such counterbalance being achieved by regulating the amount of ethyl chloride employed in the initial reaction mixture.

ARTHUR B. HERSBERGER.

REFERENCES CITED

The following references are of record in the file of this patent:

UNITED STATES PATENTS

| Number | Name | Date |
|---|---|---|
| 1,811,130 | Hoffman et al. | June 23, 1931 |